United States Patent [19]

Howind

[11] Patent Number: 4,655,270

[45] Date of Patent: Apr. 7, 1987

[54] WHEEL RIM FOR A PNEUMATIC TIRE

[75] Inventor: Volker Howind, Wedemark, Fed. Rep. of Germany

[73] Assignee: Continental Gummi-Werke Aktiengesellschaft, Hanover, Fed. Rep. of Germany

[21] Appl. No.: 709,526

[22] Filed: Mar. 8, 1985

[30] Foreign Application Priority Data

Mar. 8, 1984 [DE] Fed. Rep. of Germany ....... 3408402

[51] Int. Cl.$^4$ ............................................ B60B 25/00
[52] U.S. Cl. ........................... 152/380; 152/DIG. 20; 152/387
[58] Field of Search ........................ 301/95, 96, 97, 63; 152/380, 388, 379.3, 398, 379.4, 387, DIG. 8, DIG. 20

[56] References Cited

U.S. PATENT DOCUMENTS 2,551,783  5/1951  Ash .................................. 301/63 R
2,873,785  2/1959  Howard ............................ 152/380
4,408,647 10/1983  Kuhn et al. ...................... 152/387

Primary Examiner—David A. Scherbel
Assistant Examiner—Carol L. Olson
Attorney, Agent, or Firm—Becker & Becker, Inc.

[57] ABSTRACT

A one-piece rim for a vehicle wheel, especially a truck wheel, on which a pneumatic tire is to be mounted. The rim ring is provided laterally outwardly with rim flanges which extend essentially radially inwardly. Disposed next to these rim flanges, on the radially inner side of the rim ring, are respective seating surfaces for a tire bead. To secure the tire beads on the rim, even in extreme driving situations, the rim ring includes two parts which are undetachably connected with one another and/or the wheel-center disk. Provided laterally inwardly of each rim flange is a respective one-piece clamping ring, which has an outer diameter which is greater than the inner diameter formed by the rim flanges. Spring or snap rings are provided for fixing the clamping rings in position against the tire beads.

6 Claims, 1 Drawing Figure

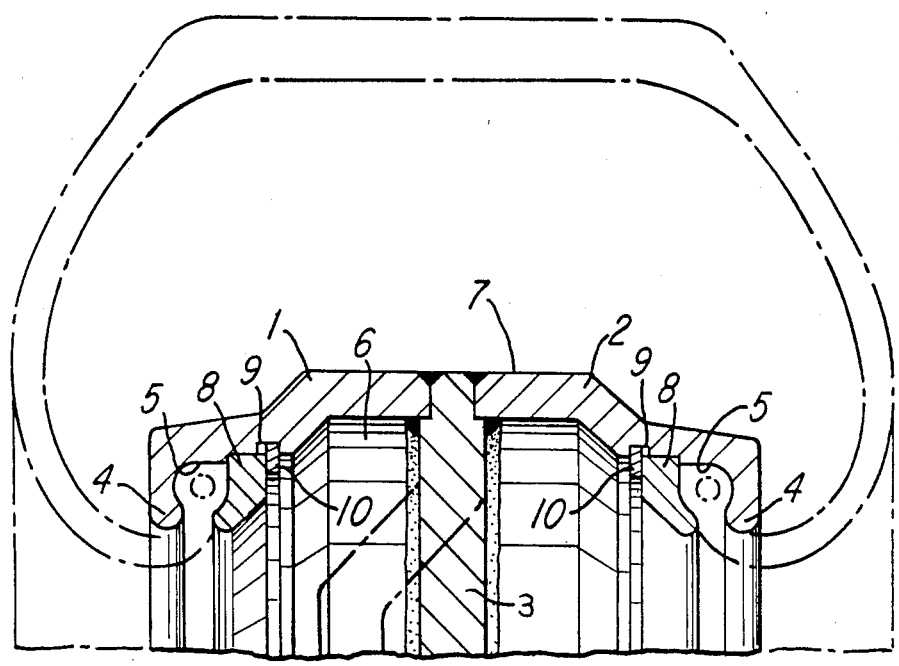

WHEEL RIM FOR A PNEUMATIC TIRE

BACKGROUND OF THE INVENTION

1. Field of the Invention

The present invention relates to a one-piece rim for a vehicle wheel on which a pneumatic tire is to be mounted, and relates in particular to such a rim for a truck wheel. The rim ring is provided laterally outwardly with respective rim flanges which extend essentially radially inwardly; disposed next to each rim flange, on the radially inner side of the rim ring, there is a respective seating surface for a tire bead.

2. Description of the Prior Art

A vehicle wheel having a rim of this general type is known from U.S. Pat. No. 4,408,647 Kuhn et al dated Oct. 11, 1983, which belongs to the assignee of the present application. As is known, truck tires are driven at considerably greater operating pressures than are passenger vehicle tires, and the carcass and bead constructions are therefore appropriately stronger.

It is an object of the present invention is to design a rim of the aforementioned general type for truck tires in such a way that the beads of such tires can be held securely on the rim in all driving situations.

BRIEF DESCRIPTION OF THE DRAWING

This object, and other objects and advantages of the present invention, will appear more clearly from the following specification in conjunction with the accompanying drawing, which is a fragmentary view showing a partial radial cross section through one inventive embodiment of a rim, and also showing via dot-dash lines furthermore as representation of a pneumatic vehicle tire mounted thereon.

SUMMARY OF THE INVENTION

The rim of the present invention is characterized primarily in that the rim ring comprises two parts which are undetachably connected with one another and/or with the wheel-center disk, in that laterally inwardly of each rim flange there is disposed a respective one-piece clamping ring having an outer diameter which is greater than the inner diameter formed by the rim flanges, and in that clamping means are provided for fixing the clamping rings against the tire beads.

Due to the inherent stability of the one-piece clamping ring, the present invention offers the advantage of being able optimally to fix the position of the tire bead, even when extremely high tension forces occur in the bead region of the tire. At the same time, all axial displacements of the tire bead on the rim are reliably prevented. A deep mounting bed is provided into which the clamping ring and the tire bead can be introduced to make easier a mounting of the tire on the rim.

The clamping means for fixing the clamping rings against the tire beads can be spring or snap rings respectively disposed in a groove on the radially inner side of each rim ring portion.

DESCRIPTION OF PREFERRED EMBODIMENTS

Referring now to the drawing in detail, the illustrated vehicle wheel comprises a first rim ring portion 1, a second rim ring portion 2, and a wheel-center disk 3 to which the rim ring portions 1 and 2 are welded. Disposed laterally outwardly on each rim ring portion 1, 2 there is provided a rim flange 4 which extends radially inwardly, and which in the illustrated embodiment is undercut on the axially inner side. A respective seating surface 5 for a tire bead is disposed next to each rim flange 4 on the radially inner side of the associated rim ring portion.

In the vicinity of the wheel disk 3, the two rim ring portions 1, 2 have a diameter which is greater than that of the seating surfaces 5, so that in each case a deep mounting bed or recessed mounting portion 6 is formed for a tire bead. In the vicinity of the deep mounting beds 6, the radially outer portions of the rim ring form a cylindrical support surface 7 for supporting the zenith portion of the tire during an emergency operation.

Associated with each rim ring portion 1, 2, on the radially inner sides thereof, there is provided a one-piece metal clamping ring 8, the average thickness of which preferably corresponds approximately to the thickness of the rim ring. Furthermore, the inner diameter formed by the clamping ring 8 can be approximately the same as the inner diameter formed by the rim flange 4. Each clamping ring 8 serves to fix an associated tire bead in its operating position, and is held by a spring or snap ring 10 which is mounted in a groove 9, so that in each circumferential section of the clamping ring 8, axial forces of the same magnitude can be absorbed. If the requirements are not so great, the snap ring 10 can also be replaced by a plurality of screws which are distributed about the periphery, or by abutment members which are screwed onto the rim ring.

The manufacture of a rim is as follows: First of all, the two rim ring portions 1, 2 are made, preferably by being formed or turned. Subsequently, the two clamping rings 8 and the two snap rings 10 are introduced into the respective interior of the rim ring portions 1, 2. Only then are the rim ring portions 1, 2 welded onto the wheel-center disk 3, and the parallel percussion welding seam is finished. If necessary, the wheel disk 3 can also have the form shown in dot-dash lines, or can even have some other form.

To mount a tire, which in the drawing is shown by dot-dash lines, the rim is initially moved toward the tire at essentially right angles thereto, and subsequently the rim is rotated within the tire until the axes of rotation of the tire and of the rim extend parallel to one another. At this point, the tire beads are disposed laterally outwardly of the associated rim flanges 4. Further mounting of the tire is effected in a known manner. After the tire beads, as a result of this further mounting, are disposed in their operating position on the associated rim seating surfaces 5, the clamping rings 8 are pushed against the beads, and are secured in this position with the aid of the snap rings 10. If desired, the rings 10 also can be mounted after the rim has been welded together.

In the illustrated embodiment, in the vicinity of the tire beads, in addition to the rim flanges 4 being undercut, the clamping rings 8 are also undercut, so that when high tension forces are encountered at the side wall of the tire, the tire bead is clamped even more strongly in the tapering gap. A second function of the clamping ring 8 is to prevent the tire bead from shifting axially inwardly when axial tangential forces occur.

The present invention is, of course, in no way restricted to the specific disclosure of the specification and drawing, but also encompasses any modifications within the scope of the appended claims.

What I claim is:

1. A one-piece rim for a vehicle wheel on which a pneumatic tire is to be mounted; said rim having a rim ring, on the two laterally outer sides of which are respective rim flanges, each of which extends essentially radially inwardly; disposed next to, and axially inwardly of, each of said rim flanges, on the radially inner side of said rim ring, there is furthermore a respective seating surface for a tire bead; the improvement therewith which comprises:

a rim ring made of two parts, each of which is provided with one of said rim flanges and one of said seating surfaces;

a respective one-piece clamping ring disposed shiftable axially inwardly of each of said rim flanges before tire mounting for holding a tire bead in position on its seating surface and against its rim flange; each of said clamping rings having an outer diameter which is greater than the inner diameter of the assiciated rim flange; and axially shiftable clamping means for fixing each of said clamping rings against a tire bead.

2. A wheel rim according to claim 1, which includes a wheel-center disk, and in which said two rim ring parts are undetachably connected with at least one of each other and said wheel disk.

3. A wheel rim according to claim 1, in which each of said rim ring parts is provided with a circumferentially extending groove on its radially inner side; and in which said clamping means comprises respective snap rings for each of said clamping rings, with each of said snap rings being disposed in one of said grooves.

4. A wheel rim according to claim 1, in which said two rim ring parts are welded onto a wheel-center disk.

5. A wheel rim according to claim 1, in which, in the vicinity of a given tire bead, at least one of the associated rim flange and clamping ring is undercut.

6. A wheel rim according to claim 1, in which the inner diameter of each of said clamping rings corresponds approximately to the inner diameter of the associated rim flange.

* * * * *